United States Patent [19]

Muramatsu et al.

[11] Patent Number: 5,879,809

[45] Date of Patent: Mar. 9, 1999

[54] THERMOPLASTIC RESIN/OIL-BLEEDING SILICONE RUBBER INTEGRALLY MOLDED ARTICLES

[75] Inventors: Shigeru Muramatsu, Chigasaki; Naoto Obayashi, Hiratsuka; Hironao Fujiki; Shigeki Shudo, both of Usui-gun, all of Japan

[73] Assignees: Mitsubishi Engineering-Plastics Corporation; Shin-Etsu Chemical Co., Ltd., both of Tokyo, Japan

[21] Appl. No.: 760,337

[22] Filed: Dec. 4, 1996

[30] Foreign Application Priority Data

Dec. 18, 1995 [JP] Japan .................................. 7-347894

[51] Int. Cl.$^6$ ............................ B32B 27/28; B32B 25/20
[52] U.S. Cl. .................... 428/412; 428/447; 428/458; 428/461; 428/475.5; 524/506; 524/537; 524/538; 524/539

[58] Field of Search ........................... 525/100; 428/412, 428/447, 458, 461, 475.5; 524/506, 537, 538, 539

[56] References Cited

U.S. PATENT DOCUMENTS 4,923,944   5/1990   Yamada et al. ........................ 528/15
5,366,805  11/1994   Fujiki et al. ........................... 428/412

*Primary Examiner*—Robert Dawson
*Assistant Examiner*—D. Aylward
*Attorney, Agent, or Firm*—Millen, White, Zelano, & Branigan, P.C.

[57] ABSTRACT

A thermoplastic resin, especially a thermoplastic resin having blended therein a thermoplastic resin oligomer containing an aliphatic unsaturated group is integrally molded with an oil-bleeding silicone rubber, yielding a molded article wherein the resin and the rubber are firmly integrated.

7 Claims, 4 Drawing Sheets

THERMOPLASTIC RESIN/OIL-BLEEDING SILICONE RUBBER INTEGRALLY MOLDED ARTICLES

BACKGROUND OF THE INVENTION

1. Field of the Invention

This invention relates to integrally molded articles of thermoplastic resin and oil-bleeding silicone rubber which can be easily and briefly molded by means of injection molding machines and which will find use in electric, electronic, automotive and precision machinery applications.

2. Prior Art

A number of techniques are known in the art for bonding addition curing type silicone rubber to organic resins. For example, a molded resin on the surface is coated with a primer and a curable silicone rubber is applied and cured thereto. Another joining technique is to cure a self-adhesive silicone rubber composition to a molded resin. There are known a number of patents relating to self-adhesive silicone rubber compositions, especially adhesive components thereof. Japanese Patent Publication (JP-B) No. 34311/1990 corresponding to EP 143994A discloses that an organopolysiloxane containing more than 30 mol % of a hydrogen atom directly attached to a silicon atom is added to an organic resin which is joined to an addition curing type silicone rubber. In JP-B 45292/1988, silicone rubber is physically fitted in an organic resin. Japanese Patent Application Kokai (JP-A) No. 183843/1988 corresponding to 276790 discloses a method of integrally joining silicone rubber to an olefin resin having grafted thereto a compound containing an aliphatic unsaturated group and a hydrolyze group attached to a silicon atom. In JP-A 111981/1993 corresponding to U.S. Pat. No. 5,366,806 by the same assignee as the present invention, silicone rubber is integrally joined to a thermoplastic resin having added thereto a compound containing an unsaturated group and a hydrogen atom directly attached to a silicon atom.

These methods, however, have more or less problems. The method using a primer is cumbersome in that a once molded resin part must be taken out of the mold before a primer can be applied. The method of curing a self-adhesive silicone rubber material to a molded resin has the serious problem that when the silicone rubber-coated resin is molded in a mold, the silicone rubber itself adheres to the mold. Insofar as silicone rubber is applied and cured to resin moldings, no problems occur on practical use. However, addition curable silicone self-adhesive compositions do not provide sufficient bonding forces when integrally molded with several of versatile resins, for example, ABS, PPO, PPS, polycarbonate, acryl, PE, PP and Teflon resins. Among the above-mentioned proposals, the method of adding hydrogenpolysiloxane to olefin resins has the problem that the resin is less likely to exert its inherent properties because the properties of the resin itself can be altered by the siloxane added thereto. The physical engagement between silicone rubber and organic resin can be disrupted by physical forces. The use of an olefin resin having grafted thereto a compound containing an aliphatic unsaturated group and a hydrolyzable group attached to a silicon atom requires a primer for the integration of an addition curing type silicone rubber.

As silicone rubber is recognized highly reliable with respect to heat resistance, weather resistance and electrical properties, it finds expanding application to electric, electronic and automotive fields. Since oil seals, connectors, O-rings, and other automotive parts require operation efficiency upon assembly, tightness and insulation as mounted, it is desirable and advantageous to provide integrally molded articles having a thermoplastic resin firmly joined to an oil-bleeding silicone rubber allowing oil to bleed to the surface after molding.

In this regard, we already proposed in JP-A 171021/1994 and 171023/1994 corresponding to U.S. Pat. No. 5,366,805 and U.S. Pat. No. 5,418,065 an integrally molded article wherein a thermoplastic resin containing an aliphatic unsaturated group and a silicone rubber containing a specific adhesive agent are integrally molded to form a firm joint therebetween. No reference was made to joint with oil-bleeding silicone rubber because such bonding was technically difficult at that time.

SUMMARY OF THE INVENTION

An object of the present invention is to provide an integrally molded article of a thermoplastic resin firmly joined with an oil-bleeding silicone rubber allowing oil to bleed to the surface.

We have found that when a thermoplastic resin, especially a thermoplastic resin having blended therein a thermoplastic resin oligomer containing an aliphatic unsaturated group is joined to an oil-bleeding silicone rubber, they are firmly integrated together, leading to an integrally molded article of thermoplastic resin/oil-bleeding silicone rubber exhibiting a practically acceptable bonding force. When a selected adhesive agent is blended in the silicone rubber composition, the silicone rubber composition can be applied to the thermoplastic resin by injection molding such that the silicone rubber composition would briefly cure to the thermoplastic resin to form a firm junction. Additionally, the silicone rubber itself is releasable from the mold in a practically acceptable manner. Then the integrally molded article of quality can be produced in an industrially advantageous manner.

Accordingly, the present invention provides an integrally molded article comprising a thermoplastic resin, especially a thermoplastic resin having blended therein a thermoplastic resin oligomer containing an aliphatic unsaturated group, and an oil-bleeding silicone rubber integrally molded together.

BRIEF DESCRIPTION OF THE DRAWINGS

These and further features of the present invention will be apparent with reference to the following description and drawings, wherein.

DETAILED DESCRIPTION OF THE INVENTION

Figure 1A:
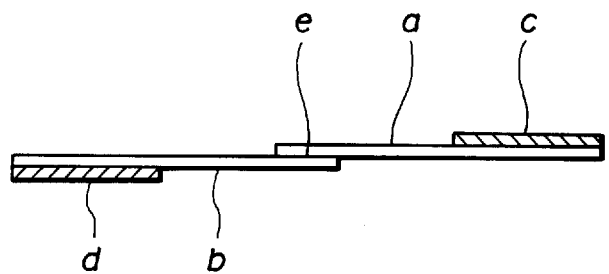
FIG. 1 illustrates a test specimen used in an adhesion test, FIG. 1(A) being a side view and FIG. 1(B) being a plan view.

As a first component, the invention uses a thermoplastic resin, preferably a thermoplastic resin composition comprising a thermoplastic resin and a thermoplastic resin oligomer containing an aliphatic unsaturated group blended therein.

The thermoplastic resins used herein include conventional thermoplastic resins resulting from olefinic polymerization and thermoplastic resins resulting from polycondensation. Examples are ABS resins (acrylonitrile-butadiene-styrene copolymers), styrene resins, polyethylene resins, polypropylene resins, acryl resins, polycarbonate resins, polyethylene terephthalate resins, polybutylene terephthalate resins, polyphenylene oxide resins, polyphenylene sulfide resins, polysulfone resins, nylon resins, and liquid crystal resins. Mixtures of such resins are also useful. More particularly, useful resins include polycarbonate resins end-blocked with tert-butylphenol polymerized as are thermoplastic resin oligomers containing an aliphatic unsaturated group to be described later, polyethylene terephthalate resins and polybutylene terephthalate resins synthesized by polycondensation, and polypropylene resins synthesized by coordination polymerization using Ziegler-Natta catalysts as well as commercially available ABS resin, styrene resins, polyethylene resins, acryl resins, nylon resins, polyphenylene oxide resins, polyphenylene sulfide resins, polysulfone resins, and liquid crystal resins.

The thermoplastic resin oligomer containing an aliphatic unsaturated group to be blended in the above-mentioned thermoplastic resin in one preferred embodiment of the invention is a compound having a unit constituting the above-mentioned thermoplastic resin and containing an aliphatic unsaturated group on a side chain or at an end. Useful are reactive groups capable of hydrosilylation with a hydrogen atom directly attached to a silicon atom in the presence of platinum catalysts. Compounds having alkenyl groups having 2 to 10 carbon atoms, especially 2 to 4 carbon atoms such as vinyl, allyl, and isopropenyl groups are thus desirable. In this respect, it is preferred to exclude compounds having an aliphatic unsaturated group inside a carbon-to-carbon linkage chain of a thermoplastic resin.

In order to maintain the properties of solidified thermoplastic resin, it is desirable that the oligomer have a high molecular weight. However, if a large amount of aliphatic unsaturated group is contained in one molecule, there can occur short curing of silicone rubber on the surface of solidified thermoplastic resin. Then the amount of the oligomer added should be limited. Inversely, if the thermoplastic resin oligomer containing an aliphatic unsaturated group has a low molecular weight, it would adversely affect the properties of solidified thermoplastic resin. For the purposes of preventing any loss of the properties of the thermoplastic resin and short curing of silicone rubber, it is then desirable to control the molecular weight of the thermoplastic resin oligomer and the content of aliphatic unsaturated group. Specifically, the thermoplastic resin oligomer should preferably have a number average molecular weight of about 250 to about 5,000, more preferably about 1,000 to about 3,000. The content of aliphatic unsaturated group should preferably be about 0.1 to 70 mol %, more preferably about 1 to 50 mol %, especially about 5 to 30 mol % based on the total of recurring units (inclusive of terminal groups) constituting the oligomer.

More particularly, the thermoplastic resin oligomer containing an aliphatic unsaturated group should contain at least one aliphatic unsaturated double or triple bond in its backbone and terminal groups on the average in a molecule. Since triple bonds tend to degrade the weather resistance and heat resistance of resins, double bonds are preferred. The unsaturated double bond contained in the resin may be of any olefinic alkenyl group, desirably vinyl, allyl and isopropenyl groups. It is preferred to avoid internal olefins.

These oligomers which are modified with aliphatic unsaturated groups in their molecule are not particularly limited as long as they are thermoplastic resin oligomers satisfying the above-mentioned requirements. From the standpoints of compatibility with resins and physical property retention, thermoplastic polycarbonate oligomers and thermoplastic polyester oligomers are preferred. They are described below in detail.

The thermoplastic polycarbonate oligomers may be prepared by solution techniques as used for the preparation of conventional aromatic thermoplastic resins such as interfacial polymerization, pyridine, and chloroformate techniques except that dihydric phenols having an aliphatic unsaturated bond are used as a starting reactant and/or a monofunctional compound having an aliphatic unsaturated bond is used as a molecular weight modifier or terminal stopper.

Preferred dihydric phenols for use in the preparation of the thermoplastic polycarbonate oligomers are those of the following general formula (A).

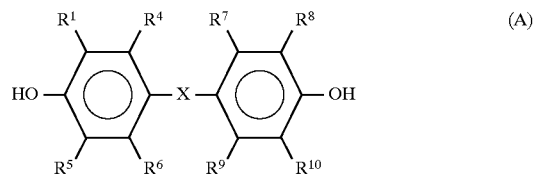

In formula (A), $R^3$ to $R^{10}$ are independently selected from a hydrogen atom, halogen atom, and substituted or unsubstituted alkyl, alkoxy, aryl and alkenyl groups having 1 to 12 carbon atoms, especially 1 to 8 carbon atoms. X is selected from the following groups:

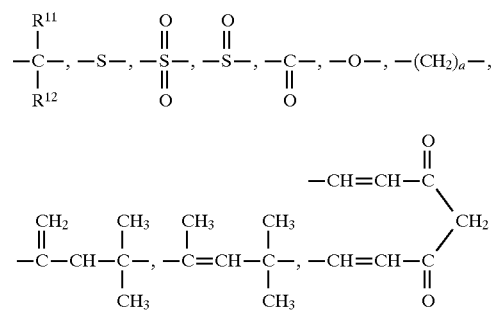

wherein $R^{11}$ and $R^{12}$ are independently selected from a hydrogen atom, halogen atom, and substituted or unsubstituted alkyl, aryl, alkenyl and alkynyl groups having 1 to 8 carbon atoms, especially 1 to 6 carbon atoms or taken together, form a carbocyclic ring or heterocyclic ring, and letter a is a positive number of at least 1.

Illustrative examples of the dihydric phenol include
2,2-bis(4-hydroxy-3-allylphenyl)propane,
2,4-bis(4-hydroxyphenyl)-4-methyl-1-pentene,.
2,4-bis(4-hydroxyphenyl)-4-methyl-2-pentene,
bis(4-hydroxyphenyl)methane,
bis(4-hydroxyphenyl)ether,
bis(4-hydroxyphenyl)sulfone,
bis(4-hydroxyphenyl)sulfoxide,
bis(4-hydroxyphenyl)sulfide,
bis(4-hydroxyphenyl)ketone,
1,1-bis(4-hydroxyphenyl)ethane,
2,2-bis(4-hydroxyphenyl)propane or bisphenol A,
2,2-bis(4-hydroxyphenyl)butane,
1,1-bis(4-hydroxyphenyl)cyclohexane,
2,2-bis(4-hydroxy-3,5-dibromophenyl)propane,
2,2-bis(4-hydroxy-3,5-dichlorophenyl)propane,
2,2-bis(4-hydroxy-3-bromophenyl)propane, 2,2-bis(4-hydroxy-3-chlorophenyl)propane,
2,2-bis(4-hydroxy-3,5-dimethylphenyl)propane,
1,1-bis(4-hydroxyphenyl)-1-phenylethane,
bis(4-hydroxyphenyl)diphenylmethane,
2,2-bis(4-hydroxy-3-methylphenyl)propane, and
1,7-bis(4-hydroxy-3-methoxyphenyl)-1,6-heptadiene-3,5-dione or curcumin. Mixtures of two or more dihydric phenols are also useful.

Illustrative examples of the monofunctional compound having an aliphatic unsaturated double bond used for introducing an unsaturated terminal group include unsaturated carboxylic acids such as acrylic acid, methacrylic acid, vinyl acetate, 2-pentenoic acid, 3-pentenoic acid, 5-hexenoic acid, 9-decenoic acid, and 9-undecenoic acid; acid chlorides and chloroformates such as acrylic chloride, methacrylic chloride, sorbic chloride, allyl chloroformate, and isopropenyl phenyl chloroformate; phenols having an aliphatic unsaturated group such as isopropenylphenol, hydroxystyrene, o-allylphenol, eugenol, hydroxyphenyl maleimide, and allyl hydroxybenzoate; and vinylsilanes such as chloroformic acid dimethoxyvinylsilane and 3-carboxypropyldiethoxyvinylsilane. These compounds may be used in admixture of two or more. Insofar as at least one aliphatic unsaturated double bond is contained in one molecule of polycarbonate oligomer on average, conventional terminal stoppers such as phenol and p-tert-butylphenol may be used instead or in combination with a monofunctional compound having an unsaturated double bond. These terminal stoppers are desirably used in amounts of 0.1 to 70 mol %, more desirably 1 to 50 mol %, especially 5 to 30 mol % per mole of the dihydric phenol.

A branching agent may be used in an amount of 0.01 to 3 mol %, especially 0.1 to 1 mol % based on the dihydric phenol, obtaining branched polycarbonate. Examples of the branching agent include polyhydroxy compounds such as phloroglucin, 2,6-dimethyl-2,4,6-tri(4-hydroxyphenyl) heptene-3, 4,6-dimethyl-2,4,6-tri(4-hydroxyphenyl) heptene-2, 1,3,5-tri(2-hydroxyphenyl)benzole, 1,1,1-tri(4-hydroxyphenyl)ethane, 2,6-bis(2-hydroxy-5-methylbenzyl)-4-methylphenol, and $\alpha,\alpha',\alpha''$-tri(4-hydroxyphenyl)-1,3,5-triisopropylbenzene; and 3,3-bis(4-hydroxyphenyl) oxyindole or isatin bisphenol.

The thermoplastic polyester oligomers used herein include those prepared by dehydration condensation of polyfunctional carboxylic acids and polyhydric alcohols, ester exchange between polyfunctional carboxylic esters and polyhydric alcohols, and dehydrochlorination condensation of polyfunctional carboxylic halides and polyhydric alcohols in the presence of bases.

More particularly, preferred thermoplastic polyester oligomers are allyl esters synthesized by ester exchange reaction and condensation reaction between unsaturated monohydric alcohols or allyl halides and polyfunctional carboxylic acids or derivatives thereof. Also useful are unsaturated esters synthesized by polycondensation reaction between polyfunctional carboxylic acids or derivatives thereof and polyhydric alcohols. Examples of the unsaturated monohydric alcohol used in the synthesis of the allyl esters include allyl alcohol and methallyl alcohol and an example of the allyl halide is allyl chloride. The polyfunctional carboxylic acids or derivatives thereof include phthalic acid, phthalic anhydride, and isophthalic acid.

Examples of the polyfunctional carboxylic acid used in the synthesis of the unsaturated esters include saturated polyfunctional carboxylic acids-such as phthalic acid, isophthalic acid, adipic acid, sebacic acid, terephthalic acid, tetrahydrophthalic acid, tetrachlorophthalic acid, oxalic acid, malonic acid, succinic acid, and cyclopentadicarboxylic acid; and unsaturated polyfunctional carboxylic acids such as allyloxyisophthalic acid, allyloxyterephthalic acid, allylmalonic acid, maleic acid, maleic anhydride, fumaric acid, citraconic acid, mesaconic acid, itaconic acid, and tetrahydrophthalic acid.

Examples of the polyhydric alcohol include glycols such as ethylene glycol, propylene glycol, butane diol, hexamethylene glycol, hydrogenated bisphenol A, neopentyl glycol, diethylene glycol, triethylene glycol and dipropylene glycol; and alkenyl-containing ones such as glycerin monoallyl ether, trimethylolpropane monoallyl ether, pentaerythritol monoallyl ether, and pentaerythritol diallyl ether.

The thermoplastic polyester oligomers are synthesized in various ways from combinations of saturated polyfunctional carboxylic acids, unsaturated polyfunctional carboxylic acids, glycols, and polyhydric alcohols containing an alkenyl group. From the standpoints of cured properties, it is desirable to use saturated polyfunctional carboxylic acids, unsaturated polyfunctional carboxylic acids, and glycols as starting reactants.

According to the present invention, 100 parts by weight of the thermoplastic resin is preferably blended with 0.1 to 15 parts by weight of the thermoplastic resin oligomer containing an aliphatic unsaturated group to form a thermoplastic resin composition. Thermoplastic resin compositions containing more than 15 parts of the thermoplastic resin oligomer can cause short curing of addition type silicone rubber compositions. It is noted that the thermoplastic resin is blended with the thermoplastic resin oligomer by well-known heat mixing techniques such as kneader mixing and continuous extrusion kneading techniques whereupon the blend is pelletized.

In the thermoplastic resin composition, reinforcing fillers such as glass fibers and carbon fibers, stabilizers such as hindered phenols, mold release agents such as wax, and other additives may be blended in accordance with a particular purpose.

Next, the oil-bleeding silicone rubber to be integrally molded with the thermoplastic resin is described. The silicone rubber composition used herein is preferably of the heat curing type. Included are silicone rubber compositions curable with organic peroxides and silicone rubber compositions curable through addition reaction. Addition curing type silicone rubber compositions are desirable since they can be briefly molded.

One typical oil-bleeding addition curing type silicone rubber composition contains
(a) 100 parts by weight of an alkenyl group-containing organopolysiloxane,
(b) an amount of an organohydrogenpolysiloxane having at least two hydrogen atoms each directly attached to a silicon atom in a molecule, the amount being such that the molar amount of hydrogen atom directly attached to a silicon atom (that is, SiH group) available from components (b) and (d) is 0.4 to 5 equivalents per mole of the alkenyl group in component (a),
(c) a catalytic amount of a platinum catalyst,
(d) 0.1 to 50 parts by weight of an adhesive agent,
(e) 0.1 to 30 parts by weight of a non-functional silicone oil, and
(f) 0 to 50 parts by weight of finely divided silica having a specific surface area of at least 50 $m^2/g$.

Respective components of this silicone rubber composition are described below. The alkenyl group-containing organopolysiloxane (a) is selected from well-known organopolysiloxanes commonly used as a base component of conventional addition curing type silicone rubber compositions. It generally has a viscosity of about 100 to 1,000,000 centipoise at 25° C., preferably 1,000 to 100,000 centipoise at 25° C. It is preferably of the following compositional formula:

$$R_a SiO_{(4-a)/2}$$

wherein R is a substituted or unsubstituted monovalent hydrocarbon group and letter a is a positive number of 1.9 to 2.4. R is preferably selected from substituted or unsubstituted monovalent hydrocarbon groups having 1 to 10 carbon atoms, preferably having 1 to 8 carbon atoms, for example, alkyl groups such as methyl, ethyl, and propyl; alkenyl groups such as vinyl, allyl, propenyl, and butenyl; aryl groups such as phenyl and xylyl; and halo- and cyano-substituted hydrocarbon groups such as 3,3,3-trifluoropropyl and cyanoethyl. Although the substituents represented by R may be identical or different, the organopolysiloxane must contain an aliphatic unsaturated hydrocarbon group, typically alkenyl group in a molecule. Letter a has a value in the range of 1.9 to 2.4, preferably 1.95 to 2.05.

The organopolysiloxane may be either a linear one or a branched one partially containing a $RSiO_{3/2}$ or $SiO_{4/2}$ unit. Most often, it is a linear diorganopolysiloxane having a backbone consisting essentially of recurring diorganosiloxane ($R_2SiO_{2/2}$) units and terminated with a triorganosilyl ($R_3SiO_{1/2}$) unit at each end of a molecular chain. The substituent on a silicon atom is basically any of the above-mentioned ones although it is preferred to introduce vinyl as the aliphatic unsaturated group and methyl and phenyl as the other substituent. In addition, at least two of R substituents attached to a silicon atom in a molecule, preferably 0.01 to 10 mol % of R, especially 0.1 to 2 mol % of R are alkenyl groups. This alkenyl group may be attached to a silicon atom at the end of a molecular chain and/or a silicon atom midway a molecular chain. However, those organopolysiloxanes containing alkenyl groups attached to silicon atoms at both ends of a molecular chain are preferred from the standpoints of curing rate and mechanical strength of cured silicone rubber. These organopolysiloxanes can be prepared by conventional well-known methods, for example, by effecting equilibration reaction between an organocyclopolysiloxane and a hexaorganodisiloxane in the presence of an alkali or acid catalyst.

Component (b) is an organohydrogenpolysiloxane which serves as a crosslinking agent by reacting with component (a). It is not particularly limited in molecular structure and may be any of conventionally used organohydrogenpolysiloxanes of linear, cyclic, branched and three-dimensional network structures. However, it should have at least two, preferably at least three hydrogen atoms each directly attached to a silicon atom (that is, SiH groups) in a molecule.

The organohydrogenpolysiloxane should preferably have at least two, preferably at least three hydrogen atoms each attached to a silicon atom and be liquid at room temperature. Typically it is of the following general formula:

$$R'_b H_c SiO_{(4-b-c)/2}$$

wherein R' is a substituted or unsubstituted monovalent hydrocarbon group having 1 to 10 carbon atoms, preferably having 1 to 8 carbon atoms and free of an aliphatic unsaturated bond, examples of which are as mentioned above, and letters b and c are positive numbers satisfying $0.7 \leq b \leq 2.1$, $0.002 \leq c \leq 1$, and $0.8 \leq b+c \leq 3$, preferably $1 \leq b \leq 2$, $0.01 \leq c \leq 0.5$, and $1.5 \leq b+c \leq 2.6$.

Examples of the organohydrogenpolysiloxane include both end trimethylsiloxy group-blocked methylhydrogenpolysiloxane, both end trimethylsiloxy group-blocked dimethylsiloxane-methylhydrogenpolysiloxane copolymers, both end dimethylhydrogensiloxy group-blocked dimethylsiloxane, both end dimethylhydrogenpolysiloxy group-blocked dimethylsiloxane, both end dimethylhydrogenpolysiloxy group-blocked dimethylsiloxane-methylhydrogenpolysiloxane copolymers, both end trimethylsiloxy group-blocked methylhydrogenpolysiloxane-diphenylsiloxane-dimethylsiloxane copolymers, copolymers comprising $(CH_3)_2HSiO_{1/2}$ and $SiO_{4/2}$ units, and copolymers comprising $(CH_3)_2HSiO_{1/2}$, $SiO_{4/2}$ and $(C_6H_5)SiO_{3/2}$ units.

Preferably the organohydrogenpolysiloxanes is liquid at room temperature and has a viscosity of 0.1 to 500 centipoise at 25° C., more preferably 0.5 to 300 centipoise at 25° C. The number of silicon atoms in a molecule generally ranges from about 3 to about 300, preferably from about 4 to about 100.

Component (b) is added in such an amount that 0.4 to 5 equivalents, especially 0.8 to 2 equivalents of the hydrogen atom attached to a silicon atom (that is, SiH group) is available from components (b) and (d) per alkenyl group in component (a). Less than 0.4 equivalent of SiH group on this basis would result in cured silicone rubber having a too low crosslinking density and hence, less heat resistance. More than 5 equivalents of SiH group would give rise to a bubbling problem due to dehydrogenation reaction, also adversely affecting heat resistance.

The organohydrogenpolysiloxanes (b) may be prepared by per se known methods. For example, the most commonly used method is by equilibrating octamethylcyclotetrasiloxane and/or tetramethylcyclotetrasiloxane and a compound containing a triorganosiloxy unit such as hexamethyldisiloxane or 1,3-dihydro-1,1,3,3-tetramethyldisiloxane or a diorganohydrogensiloxy unit, which will become a terminal group, in the presence of a catalyst such as sulfuric acid, trifluoromethanesulfonic acid, and methanesulfonic acid at a temperature between −10° C. and +40° C.

Component (c) is a catalyst for promoting addition curing reaction or hydrosilylation between components (a) and (b). It may be a well-known catalyst. Examples are platinum and platinum compounds including platinum black, chloroplatinic acid, alcohol modified chloroplatinic acid, and complexes of chloroplatinic acid with olefins, aldehydes, vinylsiloxanes or acetylene alcohols. Platinum group metal compounds such as rhodium complexes are also useful. The amount of the catalyst added is suitably determined in accordance with a desired curing rate although it is generally in the range of 0.1 to 1,000 ppm, preferably 1 to 200 ppm of platinum or rhodium based on the weight of component (a).

Component (d) is an adhesive agent conventionally used in addition curing type silicone adhesive compositions. Useful adhesive agents are organic silicon compounds including linear and cyclic organosiloxane oligomers of 2 to 20 silicon atoms, especially 4 to 10 silicon atoms, having at least one SiH group, often 1 to 10, especially 2 to 6 SiH groups in a molecule and containing at least one group selected from the class consisting of an epoxy group (e.g., glycidoxy), alkoxysilyl group (e.g., trimethoxysilyl, triethoxysilyl and methyldimethoxysilyl) and carboxy anhydride group. Illustrative examples of the adhesive agent are given below.

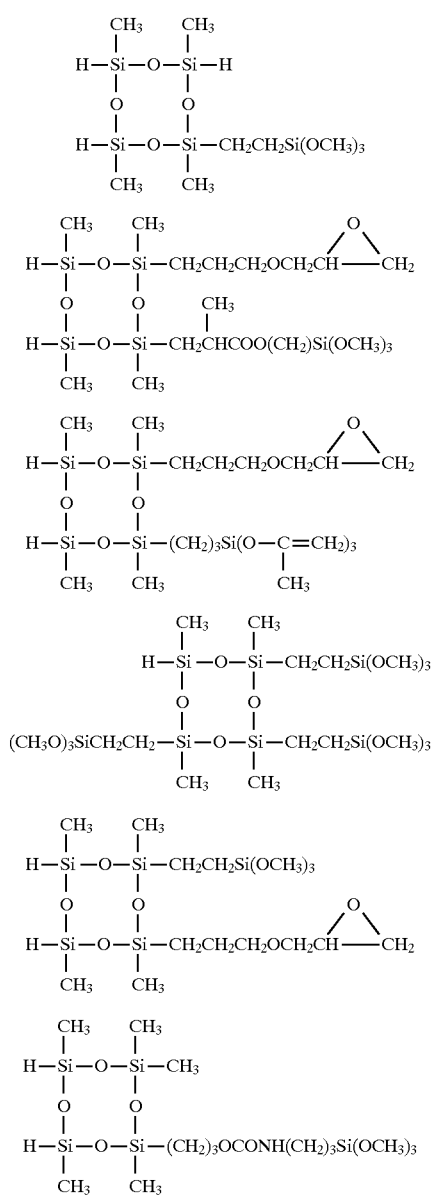

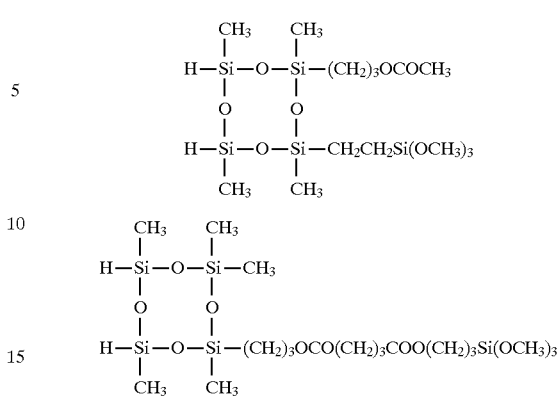

In one preferred embodiment of the invention, the above-mentioned compounds are used as component (d). Although silicone rubber compositions containing such compounds as component (d) are fully adhesive, the fully adhesive compositions can also adhere to metal molding machines, typically metal molds if such molding machines are used. The problem may be overcome by using a less adhesive material at the surface of the molding machine, for example, by applying a coating of Teflon® resin to the molding machine. This method, however, is less reliable from the standpoint of service life.

Where sticking is a problem, it is therefore recommended to use a silicon compound free of an epoxy, alkoxy or carboxy anhydride group as the adhesive agent. There are used compounds which are effectively adhesive to thermoplastic resins or compositions containing the same, but less adhesive to metals, for example, organic silicon compounds such as linear, branched and cyclic organosiloxane oligomers of 2 to 20 silicon atoms, especially 4 to 12 silicon atoms, having at least one SiH group, often 1 to 20, especially 3 to 10 SiH groups in a molecule and possessing a phenyl or phenylene skeleton. Illustrative examples of the organic silicon compound are given below. Among these, compounds containing at least two phenyl or phenylene skeletons are preferred.

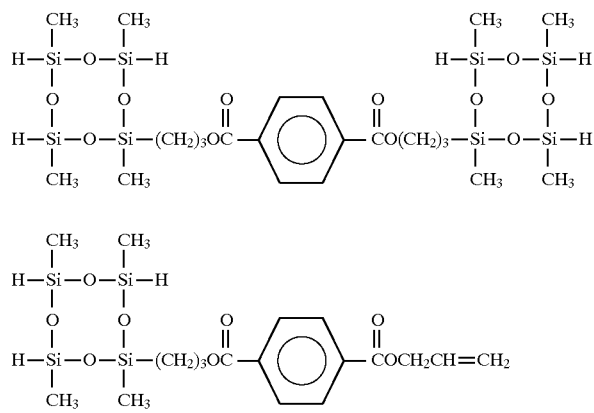

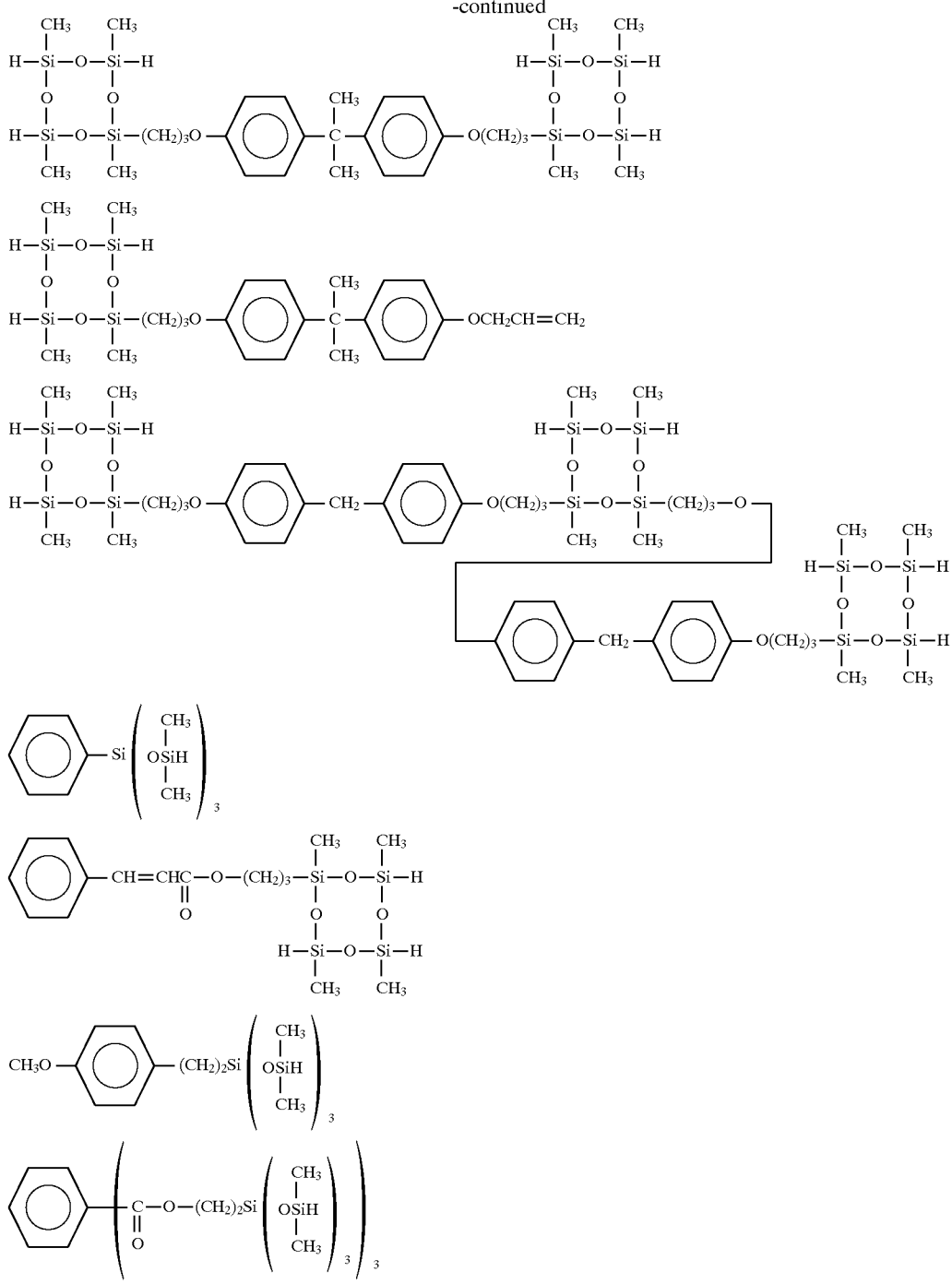

Usually 0.1 to 50 parts by weight of adhesive agent (d) is blended with 100 parts by weight of organopolysiloxane (a). Less than 0.1 part of the adhesive agent is insufficient to impart adhesion whereas more than 50 parts of the adhesive agent would allow bubbling during curing and detract from the mechanical properties of cured products.

Component (e) is a non-functional silicone oil. This silicone oil is not critical insofar as it is non-functional in the sense that it does not participate in the crosslinking (for example, hydrosilylating addition reaction) of the silicone rubber composition. Included are linear diorganopolysiloxanes which are either compatible or incompatible with dimethylpolysiloxane as a base of the silicone rubber composition, typically phenylmethylpolysiloxanes or phenylsilicone oils. The phenylsilicone oils are represented by the following formula (1) and added to silicone rubber compositions. They are essential for oil-bleeding silicone rubber compositions.

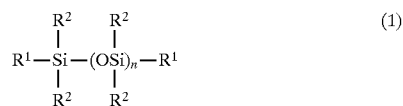

Herein, $R^1$ is a substituted or unsubstituted monovalent hydrocarbon group or hydroxyl group, $R^2$ is a substituted or unsubstituted monovalent hydrocarbon group, and phenyl groups occupy 5 to 80 mol %, especially 10 to 50 mol % of the sum of $R^1$ and $R^2$. Letter n is an integer of at least 2, especially 2 to 100. The substituted or unsubstituted monovalent hydrocarbon groups represented by $R^1$ and $R^2$ are preferably those having 1 to 12 carbon atoms, especially 1 to 8 carbon atoms, and their examples are as previously mentioned for R.

Illustrative examples of the phenylsilicone oil are given below. Note that Me is methyl and Ph is phenyl.

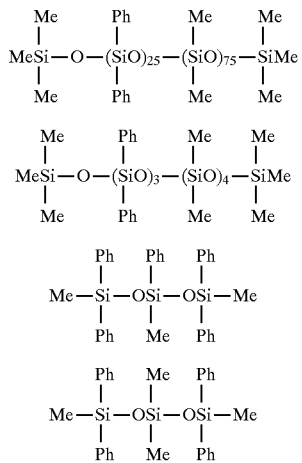

These phenylsilicone oils may be used alone or in admixture of two or more. Other examples of component (e) include non-functional dimethylpolysiloxane oils not participating in the crosslinking of well-known silicone rubber compositions, and non-functional silicone oils containing a trifluoropropyl group, non-functional silicone oils containing a perfluoroalkyl ether group, and silicone-modified perfluoroalkyl ether compounds which are incompatible with dimethylpolysiloxane used as a base of conventional silicone rubber compositions.

Usually 0.1 to 30 parts by weight of component (e) is blended with 100 parts by weight of organopolysiloxane (a). Less than 0.1 part of component (e) is insufficient to bleed whereas more than 30 parts of component (e) would detract from physical properties or allow welding lines to form upon molding.

Component (f) is finely divided silica having a specific surface area of at least 50 m²/g. It is effective for imparting strength when the silicon rubber composition cures into an elastomer. For such reinforcement purposes, silica should have a specific surface area of at least 50 m²/g, preferably about 50 to about 1,000 m²/g, especially about 100 to about 500 m²/g in BET. Finely divided silica is commercially available. For example, hydrophilic silica is available as Aerosil 130, 200 and 300 from Nihon Aerosil K. K. and Degussa Inc., Cabosil MS-5 and MS-7 from Cabot Corp., Rheorosil QS-102 and 103 from Tokuyama Soda K. K., and Nipsil L P from Nihon Silica K. K. Hydrophobic silica is available as Aerosil R-812, R-812S, R-972 and R-974 from Degussa Inc., Rheorosil MT-10 from Tokuyama Soda K. K., and Nipsil S S from Nihon Silica K. K.

Typically 0 to 50 parts by weight of the finely divided silica is blended with 100 parts by weight of organopolysiloxane (a).

Where it is necessary to adjust the curing time in order that the silicone rubber composition be commercially acceptable, an appropriate curing control agent may be added. Exemplary control agents are vinyl-containing organopolysiloxanes such as vinylcyclotetrasiloxane, triallylisocyanurate, alkyl maleates, acetylene alcohols and silane and siloxane modified products thereof, hydroperoxide, tetramethylethylenediamine, benzotriazole and mixtures thereof. There may also be added non-reinforcing fillers such as quartz powder, diatomaceous earth and calcium carbonate; coloring agents, for example, inorganic pigments such as cobalt blue and organic dyes; and heat resistance and flame retardance modifiers such as cerium oxide, zinc carbonate, manganese carbonate, iron oxide, titanium oxide, and carbon black.

According to the present invention, a curable silicone rubber composition of the above-mentioned formulation is integrally molded with a thermoplastic resin composition of the above-mentioned formulation. One method involves the steps of previously molding a thermoplastic resin composition, placing a desired shape of a curable silicone rubber composition on the thermoplastic resin preform, and heating at a temperature below the melting temperature of the thermoplastic resin. This method may use a mold or rely on coating or dipping. Another method involves the steps of previously molding a thermoplastic resin composition, placing a curable silicone rubber composition on the thermoplastic resin preform, and compressing at a temperature below the melting temperature of the thermoplastic resin (a temperature close to the softening temperature is advantageous from the economy and when thin gage parts are to be molded). A further method uses an injection molding machine and involves the steps of injection molding a thermoplastic resin composition in a mold and then heating and injecting an addition type silicone rubber composition into the mold.

It is understood that conventional thermoplastic resin molding techniques may be used for producing molded parts from the thermoplastic resin composition. One well-known technique is by pelletizing the thermoplastic resin composition, admitting it into a mold heated above the softening point of the thermoplastic resin, and cooling the mold to below the softening point. To this end, molding machines such as injection molding machines and transfer molding machines may be used.

The silicone rubber to be molded on molded parts of thermoplastic resin may take a liquid, putty or paste form in an uncured state. For ease of molding, liquid or paste silicone rubber compositions known as liquid silicone rubber are desirable. The silicone rubber composition is generally cured at about 100° to 150° C. for several ten seconds to about 10 minutes. In order for the silicone rubber to develop a higher bond strength with the thermoplastic resin, especially thermoplastic resin free of an aliphatic unsaturated group, curing conditions including a temperature of 100° to 150° C. and a time of 2 to 10 minutes, especially 3 to 10 minutes are advantageous.

There has been described a molded article wherein a thermoplastic resin and an oil-bleeding silicone rubber are integrally molded together to form a firm junction.

EXAMPLE

Examples of the present invention are given below by way of illustration and not by way of limitation. All parts are by weight. The specific surface area was measured by BET.

Preparation Example 1

Preparation of oil-bleeding silicone rubber composition (A)

An oil-bleeding, liquid, addition curing type silicone rubber composition (A) was prepared by charging a kneader with 100 parts of a dimethylsiloxane polymer blocked with a dimethylvinylsilyl group at each end of a molecular chain and having a viscosity of 10,000 centipoise at 25° C., 10 parts of a phenylsilicone oil of formula (I) shown below, 40 parts of fumed silica having a specific surface area of 300 m²/g, 8 parts of hexamethyldisilazane, and 1 part of water, mixing them at room temperature for 1 hour, heating at 150° C., and mixing at the temperature for 2 hours. The mixture was then cooled down to room temperature. To the mixture were added 20 parts of the dimethylsiloxane polymer blocked with a dimethylvinylsilyl group at each end and having a viscosity of 10,000 centipoise at 25° C., 3 parts of hydrogenmethylpolysiloxane of formula (II) shown below having a viscosity of about 10 centipoise at 25° C., 4 parts of a vinylmethylpolysiloxane containing 5 mol % of a methylvinylsiloxane (—Si(CH₃)(CH=CH₂)O—) unit having a vinyl group directly attached to a silicon atom in a side chain and having a viscosity of 1,000 centipoise at 25° C., 0.1 part of acetylene alcohol for extending the curing time at room temperature, and 50 ppm calculated as platinum atom of a platinum vinylsiloxane complex. Mixing was continued until a uniform blend was obtained.

$$\begin{array}{c} \text{Me} \quad \text{Ph} \quad \text{Me} \quad \text{Me} \\ | \quad | \quad | \quad | \\ \text{MeSi}-\text{O}-(\text{SiO})_{25}-(\text{SiO})_{75}-\text{SiMe} \\ | \quad | \quad | \quad | \\ \text{Me} \quad \text{Ph} \quad \text{Me} \quad \text{Me} \end{array} \quad \text{(I)}$$

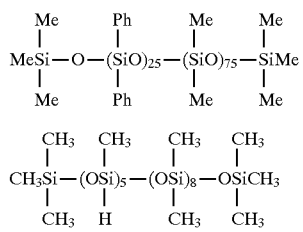

(II)

Preparation Example 2
Preparation of oil-bleeding silicone rubber composition (B)

An oil-bleeding silicone rubber composition (B) was prepared by charging a kneader with 100 parts of a dimethylsiloxane polymer blocked with a dimethylvinylsilyl group at each end of a molecular chain and having a viscosity of 10,000 centipoise at 25° C., 10 parts of a phenylsilicone oil of formula (I), 40 parts of fumed silica having a specific surface area of 300 m²/g, 8 parts of hexamethyldisilazane, and 1 part of water, mixing them at room temperature for 1 hour, heating at 150° C., and mixing at the temperature for 2 hours. The mixture was then cooled down to room temperature. To the mixture were added 20 parts of the dimethylsiloxane polymer blocked with a dimethylvinylsilyl group at each end and having a viscosity of 10,000 centipoise at 25° C., 5 parts of a low molecular weight methylphenylsilicone oil of formula (III) shown below, 3 parts of hydrogenmethylpolysiloxane of formula (II) having a viscosity of about 10 centipoise at 25° C., 4 parts of a vinylmethylpolysiloxane containing 5 mol % of a methylvinylsiloxane (—Si(CH₃)(CH=CH₂)O—) unit having a vinyl group directly attached to a silicon atom in a side chain and having a viscosity of 1,000 centipoise at 25° C., 0.1 part of acetylene alcohol for extending the curing time at room temperature, and 50 ppm calculated as platinum atom of a platinum vinylsiloxane complex. Mixing was continued until a uniform blend was obtained.

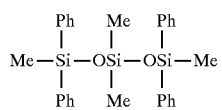

(III)

Preparation Example 3

Preparation of oil-bleeding silicone rubber composition (C)

An oil-bleeding silicone rubber composition (C) was prepared by charging a kneader with 100 parts of a dimethylsiloxane polymer blocked with a dimethylvinylsilyl group at each end of a molecular chain and having a viscosity of 10,000 centipoise at 25° C., 10 parts of a trifluoropropyl(methyl)silicone oil of formula (VII) shown below, 40 parts of fumed silica having a specific surface area of 300 m²/g, 8 parts of hexamethyldisilazane, and 1 part of water, mixing them at room temperature for 1 hour, heating at 150° C., and mixing at the temperature for 2 hours. The mixture was then cooled down to room temperature. To the mixture were added 20 parts of the dimethylsiloxane polymer blocked with a dimethylvinylsilyl group at each end and having a viscosity of 10,000 centipoise at 25° C., 3 parts of hydrogenmethylpolysiloxane of formula (II) having a viscosity of about 10 centipoise at 25° C., 4 parts of a vinylmethylpolysiloxane containing 5 mol % of a methylvinylsiloxane (—Si(CH₃)(CH=CH₂)O—) unit having a vinyl group directly attached to a silicon atom in a side chain and having a viscosity of 1,000 centipoise at 25° C., 0.1 part of acetylene alcohol for extending the curing time at room temperature, and 50 ppm calculated as platinum atom of a platinum vinylsiloxane complex. Mixing was continued until a uniform blend was obtained.

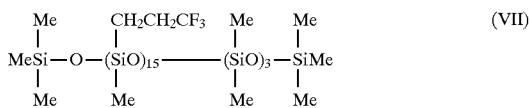

(VII)

Example 1

An injection molding machine for thermoplastic resin was used. A polycarbonate resin substantially free of an aliphatic unsaturated group having a number average molecular weight of about 10,000 was admitted into the molding machine where the resin was plasticized at 290° C. and then injected into multiple sheet-shaped cavities of a mold. The injection molding conditions included an injection time of 6 seconds, a cooling time of 30 seconds, an injection pressure of 1,000 kg/cm², a clamping pressure of 35 ton, and a cavity temperature of 100° C. A plurality of sheets of 25 mm wide×100 mm long×2 mm thick were obtained. Each of the sheets or a chromium plated metal plate of the same dimensions was set in a jig for forming a tensile shear adhesion test specimen.

Separately, silicone rubber compositions were prepared by adding 2 parts of a compound of formula (IV), (V) or (VI) as an adhesive agent to 100 parts of the oil-bleeding, liquid, addition curing type silicone rubber composition (A) obtained in Preparation Example 1.

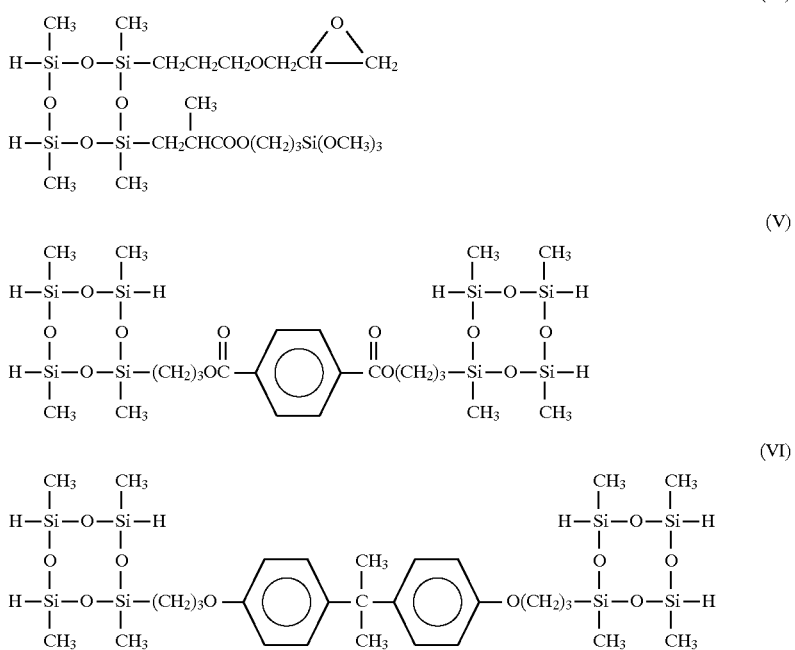

Figure 1B:
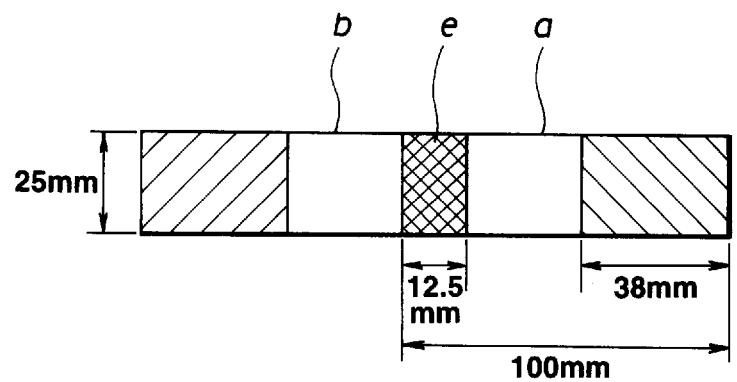

A proper amount of each silicone rubber composition was poured into the jig whereupon it was heated in a constant temperature tank at 120° C. for 8 minutes for curing the silicone rubber composition to the resin sheet or metal plate. In this way, there were obtained specimens as shown in FIG. 1, which were tested for adhesion or bonding force. More particularly, as a result of integral molding, silicone rubber layers c and d lay on one end portions of thermoplastic resin sheets a and b. The sheets were overlapped at other ends to form a lap joint e, completing a test specimen. The specimens were evaluated for adhesion according to the evaluation of tensile shear bond strength of adhesive prescribed in JIS K 6850. The results are shown in Table 1.

Example 2

Test specimens as shown in FIG. 1 were prepared by the same injection molding process and conditions as in Example 1 except that the polycarbonate resin used in Example 1 was replaced by a resin composition obtained by mixing 100 parts of the polycarbonate resin used in Example 1 with 3 parts of a polycarbonate oligomer terminally modified with an isopropenyl group, having a number average molecular weight of about 2,000, and containing about 20 mol % of an isopropenyl-containing monomer unit. The specimens were evaluated for adhesion as in Example 1, with the results shown in Table 1.

Example 3

A polybutylene terephthalate resin substantially free of an aliphatic unsaturated group having a number average molecular weight of about 20,000 was admitted into an injection molding machine where the resin was plasticized at 250° C. and then injected into multiple sheet-shaped cavities of a mold. The injection molding conditions included an injection time of 6 seconds, a cooling time of 30 seconds, an injection pressure of 1,000 kg/cm², a clamping pressure of 35 ton, and a cavity temperature of 80° C. A plurality of sheets of 25 mm wide×100 mm long×2 mm thick were obtained. Each of the sheets or a chromium plated metal plate of the same dimensions was set in a jig for forming a tensile shear adhesion test specimen.

Separately, silicone rubber compositions were prepared by adding 2 parts of a compound of formula (IV), (V) or (VI) as an adhesive agent to 100 parts of the oil-bleeding, liquid, addition curing type silicone rubber composition (A) obtained in Preparation Example 1. A proper amount of each silicone rubber composition was poured into the jig whereupon it was heated in a constant temperature tank at 120° C. for 8 minutes for curing the silicone rubber composition to the resin sheet or metal plate. In this way, there were obtained specimens as shown in FIG. 1. The specimens were evaluated for adhesion as in Example 1. The results are also shown in Table 1.

TABLE 1

|  |  | Example 1 | | Example 2 | | Example 3 | |
|---|---|---|---|---|---|---|---|
|  |  | Resin | Metal | Resin | Metal | Resin | Metal |
| Adhesive agent | (IV) | Firm Adhesion | Bond | Bond | Bond | Firm bond | Bond |
|  | (V) | Firm Adhesion | Peel | Bond | Peel | Firm bond | Peel |
|  | (VI) | Firm Adhesion | Peel | Bond | Peel | Firm bond | Peel |

It is noted that in the tensile shear adhesion test according to JIS K 6850, the specimen was rated "firm adhesion" when a bond strength of 20–25 kgf/cm² was measured, "bond" when the silicone rubber underwent cohesive failure at a bond strength in excess of 25 kgf/cm², and "peel" when the silicone rubber was peeled from the resin sheet or metal plate.

Comparative Example 1

Test specimens as shown in FIG. 1 were prepared by the same injection molding process and conditions as in Example 1 except that the polycarbonate resin used in Example 1 was replaced by a resin composition obtained by mixing 100 parts of the polycarbonate resin used in Example 1 with 20 parts of a polycarbonate oligomer terminally modified with an isopropenyl group, having a number average molecular weight of about 2,000, and containing about 20 mol % of an isopropenyl-containing monomer unit. The specimens were evaluated for adhesion as in Example 1 to find that the silicone rubber cured short at the interface with the resin.

Example 4

Figure 2:
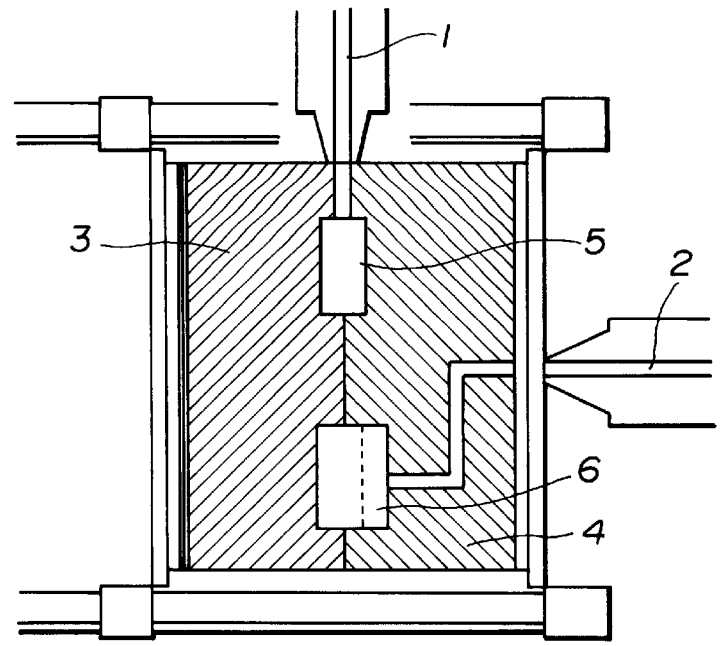
FIG. 2 is a schematic view of a co-injection molding apparatus for use in the manufacture of an integrally molded article according to the invention.

A co-injection molding machine having two injection means for thermoplastic resins and liquid silicone compositions as shown in FIG. 2 was used. In this molding machine, the injection means terminate at nozzles 1 and 2 which are connected to a mold as shown in FIG. 2. The nozzle 1 extends along a parting line and the nozzle 2 extends perpendicular to one side surface of the mold at the center. The mold consists of a left mold half 3 and a right mold half 4 whose inside surfaces are recessed to define two cavities 5 and 6 when mated.

Figure 3:
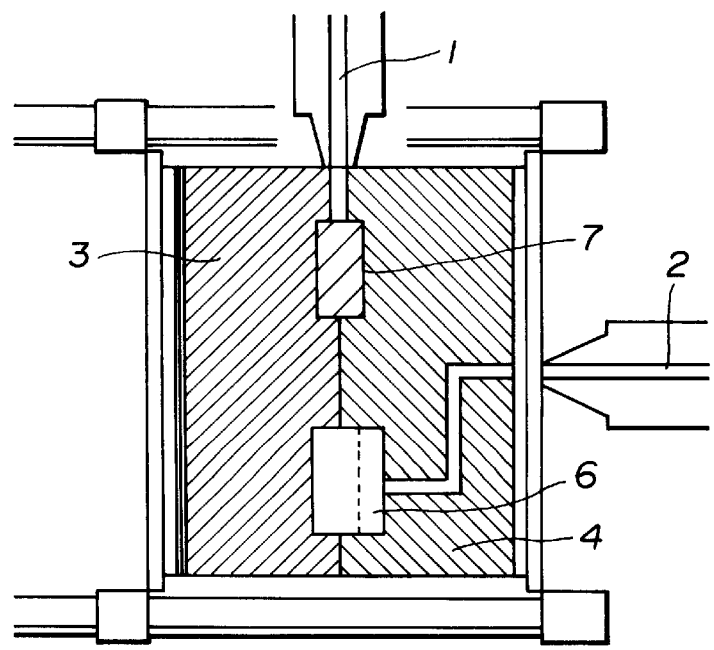
FIGS. 3 to 5 illustrate successive steps of manufacturing an integrally molded part using the co-injection molding apparatus.

A resin blend was prepared through an extruder by melt mixing at 250° C. 100 parts of a polybutylene terephthalate resin with 5 parts of a polycarbonate oligomer terminally modified with an isopropenyl group, having a number average molecular weight of about 2,000, and containing about 20 mol % of an isopropenyl-containing monomer unit, followed by cooling for solidification. The resin blend was admitted into the upper injection means where it was melted at 290° C. and injected into the cavity 5 through the nozzle 1 to mold a resin sheet 7 as shown in FIG. 3. The injection molding conditions included an injection time of 6 seconds, a cooling time of 35 seconds, and a temperature of 100° C. at the cavity 5 and left mold half 3.

Figure 4:
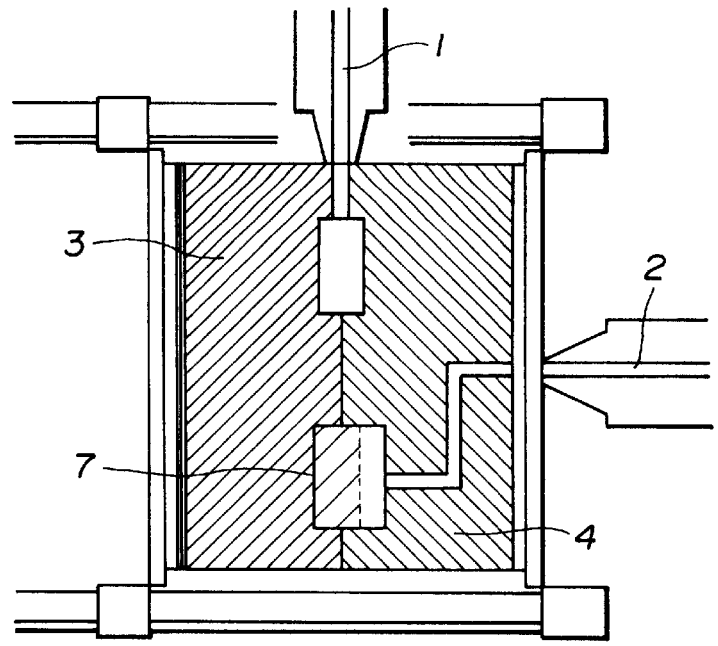

Then the right mold half 4 was removed to open the mold. The left mold half 3 was rotated 180° with the molded resin sheet 7 retained in its cavity. The right mold half 4 as mated again and clamped, thereby defining a silicone rubber molding cavity between the exposed surface of the molded resin sheet 7 and the cavity wall of the right mold half 4 as shown in FIG. 4.

Figure 5:
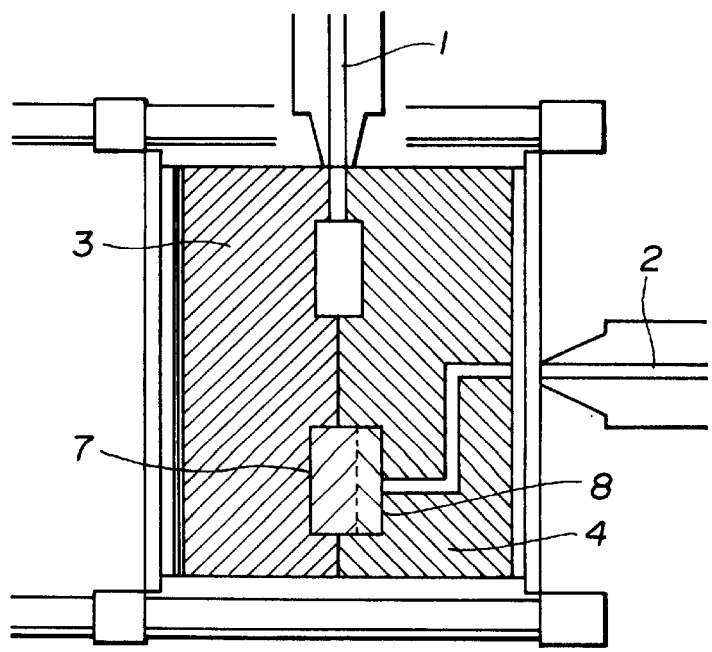
Figure 6:
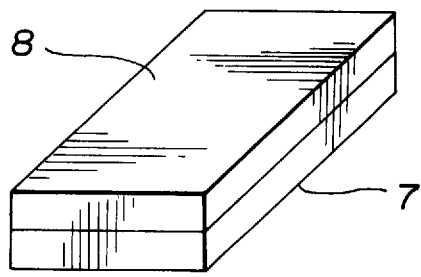
FIG. 6 is a perspective view of an integrally molded article according to the invention.

In this state, a blend of 100 parts of the oil-bleeding, liquid, addition curing type silicone rubber composition (B) obtained in Preparation Example 2 and 0.5 or 1 part of the compound of formula (V) or (VI) was injected through the nozzle 2 to mold a rubber sheet 8 on the molded resin sheet 7 as shown in FIG. 5. The injection molding conditions included an injection time of 6 seconds, a curing time of 90 seconds, a left mold half 3 temperature of 100° C., and a right mold half 4 temperature of 1.20° C. The above-mentioned two stage molding process resulted in a composite body consisting of a resin sheet 7 and a rubber sheet 8 which were both dimensioned 2.5 mm wide×150 mm long×2 mm thick as shown in FIG. 6. The composite moldings using the silicone rubber compositions containing 0.5 and 1 part of the compounds of formulae (V) and (VI) all showed a firm bond at the joint and were excellent in mold release, dimensional precision and productivity.

Example 5

Composite moldings were prepared as in Example 4 except that the oil-bleeding, liquid, addition curing type silicone rubber composition (B) was replaced by the oil-bleeding, liquid, addition curing type silicone rubber composition (C) obtained in Preparation Example 3. The composite moldings using the silicone rubber compositions containing 0.5 and 1 part of the compounds of formulae (V) and (VI) all showed a firm bond at the joint and were excellent in mold release, dimensional precision and productivity.

Japanese Patent Application No. 347894/1995 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An integrally molded article comprising a thermoplastic resin and an oil-bleeding silicone rubber integrally molded together, said thermoplastic resin having blended therein 0.1 to 15 parts by weight of a thermoplastic resin oligomer having a number average molecular weight of 250 to 5,000 and containing 0.1 to 30 mol % of a monomer unit having an aliphatic unsaturated group per 100 parts by weight of the thermoplastic resin.

2. An integrally molded article of claim 1, wherein said thermoplastic resin oligomer is a thermoplastic polycarbonate or polyester oligomer having a number average molecular weight of 250 to 5,000.

3. An integrally molded article of claim 1 wherein said oil-bleeding silicone rubber is obtained by curing a silicone rubber composition comprising (a) 100 parts by weight of an alkenyl group-containing organopolysiloxane, (b) an amount of an organohydrogenpolysiloxane having at least two hydrogen atoms each directly attached to a silicon atom in a molecule, said amount being such that the molar amount of hydrogen atom directly attached to a silicon atom available from components (b) and (d) is 0.4 to 5 equivalents per mole of the alkenyl group in component (a), (c) a catalytic amount of a platinum catalyst, (d) 0.1 to 50 parts by weight of an adhesive agent, (e) 0.1 to 30 parts by weight of a non-functional silicone oil, and (f) 0 to 50 parts by weight of finely divided silica having a specific surface area of at least 50 m$^2$/g.

4. An integrally molded article as in claim 1, wherein the thermoplastic resin is selected from the group consisting of polycarbonate resins end-blocked with tert-butyl-phenol, polyethylene terephthalate resins, polybutylene terephthalate resins, polypropylene resins, ABS resin, styrene resins, polyethylene resins, acryl resins, nylon resins, polyphenylene oxide resins, polyphenylene sulfide resins, polysulfone resins, and liquid crystal resins.

5. An integrally molded article as in claim 3, wherein the adhesive agent (d) of the silicone rubber composition is a linear or cyclic organosiloxane oligomer of 2 to 20 silicon atoms having at least one SiH group in a molecule and containing at least one group selected from the class consisting of an epoxy group, alkoxysilyl group and carboxy anhydride group.

6. An integrally molded article as in claim 3, wherein the adhesive agent (d) of the silicone rubber composition is a linear, branched or cyclic organosiloxane oligomer of 2 to 20 silicon atoms having at least one SiH group in a molecule and possessing a phenyl or phenylene skeleton.

7. An integrally molded article as in claim 3, wherein the non-functional silicone oil (e) is one represented by the following formula (1):

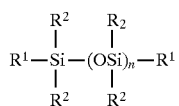
(1)
wherein $R^1$ is a substituted or unsubstituted monovalent hydrocarbon group or hydroxyl group, $R^2$ is a substituted or unsubstituted monovalent hydrocarbon group, and phenyl groups occupy 5 to 80 mol % of the sum of $R^1$ and $R^2$, and letter n is an integer of at least 2.
* * * * *